April 14, 1953          G. W. WITHERS          2,634,932
                           PALLET
Filed May 19, 1949                        2 SHEETS—SHEET 1
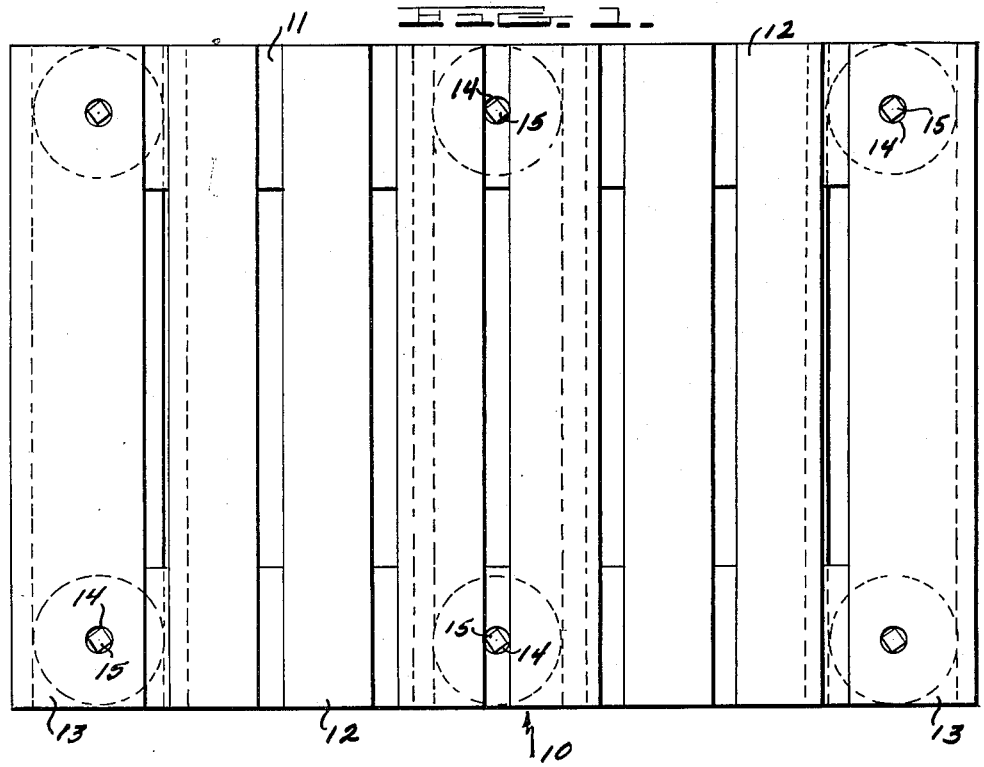
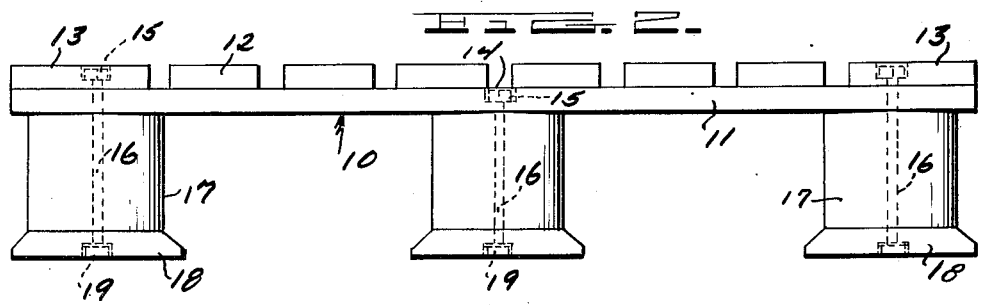
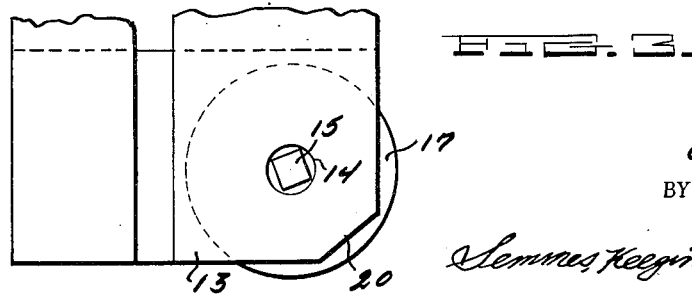
INVENTOR.
GILBERT W. WITHERS
BY
Semmes, Keegin, Robinson & Semmes
ATTORNEYS

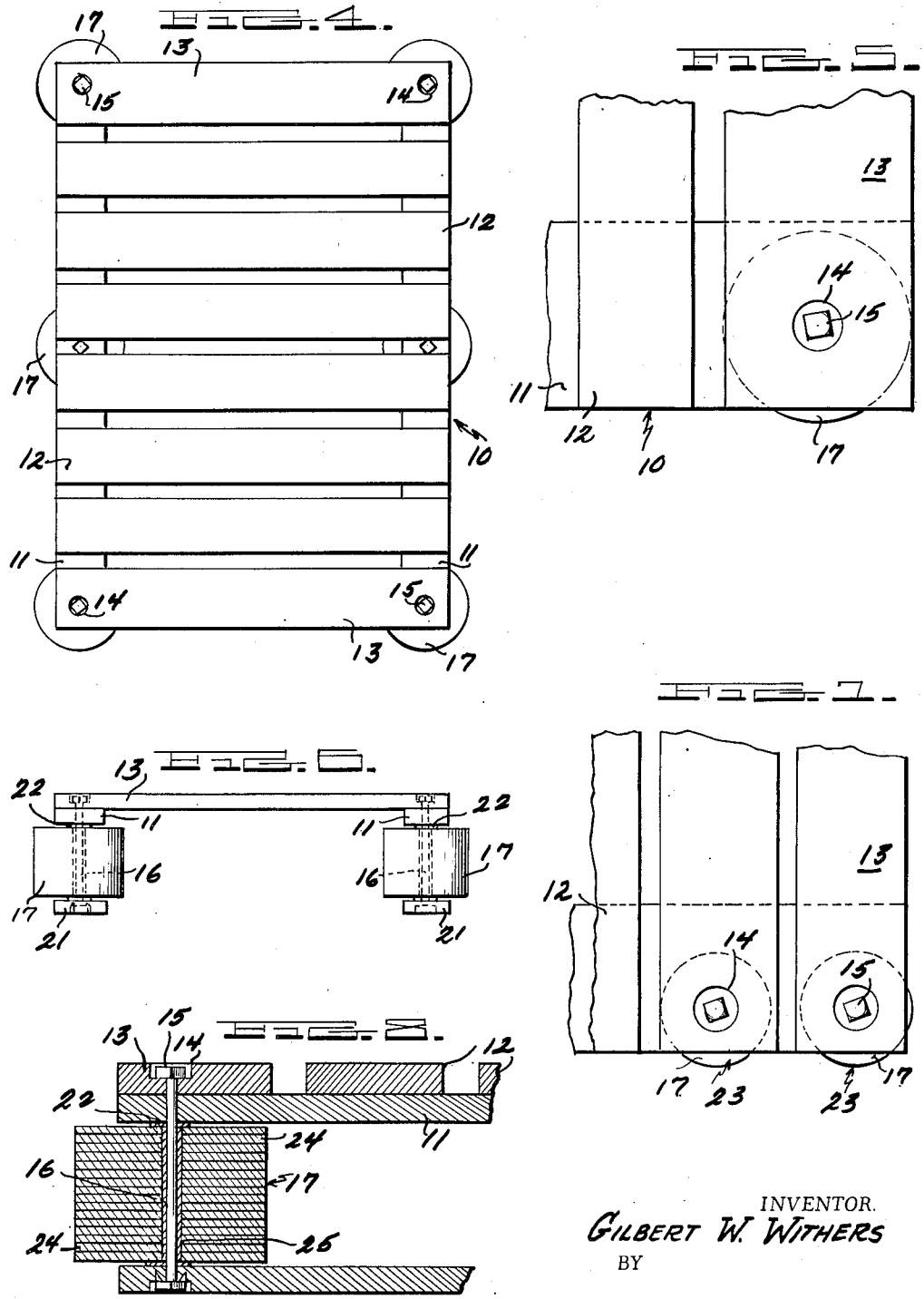

Patented Apr. 14, 1953

2,634,932

UNITED STATES PATENT OFFICE 2,634,932

PALLET

Gilbert W. Withers, Atlanta, Ga.

Application May 19, 1949, Serial No. 94,199

5 Claims. (Cl. 248—120)

The present invention relates to pallets for use in the handling of packaged and crated materials, and has particular reference to an improved form of pallet adapted for elevation and movement by truck employing fork lifts or other lifting apparatus for lifting the loaded pallet and movement to a desired place of deposition.

Pallets are finding increased industrial use as a means of facilitating the movement and stacking of articles of manufacture. These pallets normally are constructed of inexpensive materials, whereby the pallet may be disposed of when it becomes damaged or worn out in use. Normally, the carrying surface of the pallet is supported by skids or blocks which are rigidly secured to the pallet framework. The lifting fork of the lift truck is inserted between the pallet supports and elevated, whereby the loaded pallet may be moved to a desired point, which may be a storage point, loading station, or the like. To facilitate operations, it has been suggested to construct the pallet so that the lifting fork may be inserted beneath the pallet surface from any side of the pallet.

The pallets are subjected to hard usage, and it has been the practice to throw away damaged pallets, rather than undertake repair.

It is an object of the present invention to provide a pallet which is easily constructed, employing inexpensive materials, and which embodies a novel system of supports for the pallet lifting surface which materially increases the life and strength of the pallet.

A further object is to provide a pallet supported by a plurality of wheel members in the place of the usual skids, which wheels members readily absorb shock incident to insertion of the lifting fork under the pallet and operation of the lifting apparatus, thereby increasing the useful life of the pallet.

A further object is to provide a pallet construction having wheel type supports which throw the lifting mechanism employed such as a lifting fork into proper alignment with the pallet, upon insertion, without damage to the wheel supports.

A further object is to provide a pallet construction which eliminates the necessity for using heavy structural members permanently assembled by nails or bolts in forming the pallet frame, thereby materially reducing the cost of the pallet and facilitating the reconstruction of damaged pallets.

A further object is to provide a pallet construction having supporting members which are free from sharp or blunt edge surfaces subject to deterioration through repeated contact by the fork lift or other mechanism of a lifting truck, and which are easily replaced when damaged, without disassembly of the pallet frame.

Other objects and advantages of the invention will be apparent from the following detailed description thereof, taken in connection with the drawings, wherein Figure 1 is a top plan view of one embodiment of the invention;

Figure 2 is a side view thereof;

Figure 3 is an enlarged partial plan view of a preferred edge construction of the pallet;

Figure 4 is a top plan view of the invention with the roller surfaces displaced outwardly from the edge of the pallet;

Figure 5 is an enlarged detailed plan view of a modified wheel mounting;

Figure 6 is a side view of the invention;

Figure 7 is an enlarged plan view of a further embodiment of wheel construction; and Figure 8 is an enlarged view in cross section of the preferred method for assembling the wheel construction, and showing a modified form of wheel for use with the invention.

In its broadest application, the invention provides a pallet construction comprising a supporting surface, mounted upon a plurality of horizontally disposed wheel members spaced along the frame of the supporting surface, the wheel members providing for entry of the lifting fork or other lifting mechanism of the conventional industrial lift truck at any side of the pallet. With, perhaps, the exception of the wheel members, the pallet may be constructed of readily available materials, such as wood, selected on the basis of low cost and relative strength. The wheel members are mounted on an axis normal to the plane of the pallet bed, and embody a novel mounting which simplifies the assembly and repair of the pallet and minimizes the use of nails and bolts in securing the pallet frame to the supports. The wheels may be so placed on the pallet frame as to offer an anti-friction surface which protects the pallet itself from sharp contact with platforms and other obstacles, when being moved, while simultaneously serving as a means of alignment of the lifting fork of the truck relative to the pallet through rolling contact without danger of fracture of the wheel supports upon sharp or headon contact.

Referring now to Figures 1 through 3 of the drawings, the numerals 10 refers to a pallet which may be comprised of longitudinally extending spaced frame members 11 carrying platform forming cross members 12 which may be spaced from each other as shown, or mounted so as to provide a continuous or solid platform surface. The pallet 10 may be of any size, and may be constructed of any desired material, for example, wood, steel, aluminum, compressed board or the like, in accordance with the use requirements for the pallet. The materials should be of a hard, durable material capable of withstanding hard usage. The frame members 11 and cross members 12 may be assembled with a design selected on the basis of the articles to be supported on the pallet, the most convenient form being the quadrilateral form shown. The members 11 and 12 may be joined by bolts, nails, or the like, or where a very light pallet is desired, the members may be glued, doweled, or entwined together in a conventional manner.

The end cross members 13 of the pallet may be slightly wider than the middle members 12 and are recessed as at 14 to receive the head 15 of a bolt 16 positioned with its axis normal to the plane of the carrying surface of the pallet, the bolt serving as an axle member in a manner to be described. As shown, there may be six bolts 16 for each pallet, the bolts in the middle section of the pallet being anchored in recesses 14 formed in the longitudinal supports 11.

In accordance with the invention, each bolt 16 carries a wheel member 17 mounted on the bolt 16 for free rotation relative to the bolt, which serves as an axle therefor. The wheel may be provided with an outwardly flared piece 18 on the end removed from the pallet to stabilize the support function of the wheel. The wheel is constructed to provide an anti-friction surface which will have a rolling action upon impact with a fixed surface. In accordance with this principle, the wheels 17 may be of any shape or thickness and composed of any number of plane surfaces, ranging from three surfaces, or roughly triangular in cross section, to infinity or a true cylindrical shape. The cylindrical shape shown is preferred because it offers less resistance to surface friction and is cheaper and easier to construct.

The wheel 17 should be constructed of a hard, durable material capable of withstanding abuse. A preferred material comprises wood, preferably selected for grain running parallel to axis of the bolt 16, offering a tough abrasion-resistant contact surface.

The bolt 16 may comprise the bolt shown in Figure 2 having a head 15 at one end and secured at the other end with a threaded nut 19. It will be apparent that the bolt 16 may be formed with a threaded nut on both ends or a slick nut threaded on one or both ends (not shown) if desired, without departing from the invention.

In Figure 3 of the drawings, a modified construction of a pallet is shown wherein the end board 13 is cut off at 20 and the axis of rotation of the wheel 17 moved laterally and outwardly relative to the pallet, whereby an anti-friction surface is provided extending beyond the end and side of the pallet, which prevents frictional contact with the surfaces of an obstacle.

Referring to Figure 4 of the drawings, the general principle exemplified in the construction shown in Figure 3 is applied to the over-all pallet 10 either by reducing the width of the longitudinally extending frame members 11 and reducing the width of the end boards 13 or by moving the axis of rotation of each wheel 17 outwardly relative to the pallet, whereby all-around protection of the carrying surface of the pallet is obtained. In this construction, as is best shown in Figure 6, it is preferred to provide a longitudinally extending bottom support member or skid 21 for anchoring the end of the bolt 16, the wheel 17 being adapted for free rotation on the bolt. In this construction, it is advisable to provide washers 22 positioned between the longitudinal members 11 and 21, and the wheel 17 to insure relatively free rotation of the wheel 17. The members 21 serve as skids for the pallet 10, running the full length of the pallet in alignment with the three wheels 17 on each side of the pallet, and provide added support for the wheel 17, strengthening the pallet construction.

In Figure 5 there is shown the preferred pallet construction and wheel location when it is desired to provide an anti-skid surface only on the side of the pallet 10, leaving a blunt friction surface on the end of the pallet represented by the exposed edge of the end cross member 13. This construction may be further developed for a particular use by providing two wheels 17 on the sides of the pallet, the wheels having surfaces 23 extending outwardly beyond the front and side edges of the pallet.

In Figure 8 there is shown a modified wheel construction particularly adapted for use in cases where a wheel is subjected to continual abuse which would lend to early destruction of a solid unitary wheel member. In this construction, the wheel 17 comprises a plurality of disks 24, apertured centrally to receive a sleeve 25 which in turn receives the bolt 16 and rotates freely thereon. The disks 24 may be constructed on any desired material such as wood, pressed fiber, etc. and have the advantage of allowing replacement of a single disk which may be damaged in use without replacement of the entire wheel assembly.

Also, the heighth of the wheel 17 may be varied merely by the addition of or removal of disk elements 24. The upper and bottom edges of the wheel 17 may be rounded to reduce wear, if desired. In some cases it may be desired to chemically treat the substance forming the wheel 17 to enable the wheels to withstand extreme variations in humidity without checking or swelling.

Once a wheel 17 is damaged, it may be replaced with minimum cost without destroying the entire pallet, as is customary when a pallet is damaged. The rolling action of the wheels 17, upon impact, absorbs most of the shock of an impact without doing damage to the wheel itself. The wheels 17 are used as a means of guiding the insertion of the lifting skid or other lifting of the device of the conventional lifting truck beneath the carrying surface of the pallet, speeding up package carrying and stacking operations without increase of damage to the pallet. The wheels 17 employed with a pallet may be varied in number as desired, depending upon the particular use intended for the pallet. The pallet itself may be assembled with a minimum use of metal parts, such as nails, bolts or reinforcing members contributing to lightness without sacrificing the strength of the pallet. A marked advantage of the invention resides in the economy of construction, and the fact that the component parts may be replaced or repaired when damaged without tearing down the pallet platform structure.

While the invention has been described with reference to the specific embodiments shown in the drawings, it is not to be limited save as defined in the appended claims.

I claim:

1. A pallet for use as a package carrying surface comprising a frame, cross members secured to the frame forming a substantially quadrilateral carrier surface, a plurality of vertically disposed axles supported on the frame, and a plurality of horizontal wheels rotatable on the axles forming supports for the frame of the pallet and providing rolling surfaces for the absorption of impact incident to lifting and transport of the pallet.

2. In the combination set forth in claim 1, the horizontal wheels being provided with a flared base portion forming a stable support base for the wheels, the tops of the wheels being substantially flush but in movable relationship with the under surface of the pallet frame.

3. A pallet for use as a package carrying surface comprising a frame, cross members on the frame forming a carrier surface, axle members on the frame, and members rotatable on the axles forming supports for the frame, the peripheries of the said members extending outwardly clear of the edges of the frames and carrier surface to provide a plurality of protective anti-friction surfaces for buffering and absorbing impact incident to lifting and transport of the pallet.

4. A pallet for use as a carrying and storing platform comprising a frame, a carrying surface on the upper surface of the frame, a plurality of bolts extending downwardly from the frame, wheels mounted on the bolts, said wheels supporting the frame in an elevated position to provide access to the lower surface of the frame for lifting the pallet, and skids secured to the bottoms of the wheels.

5. A pallet for use as a carrying and storing platform comprising a frame, a carrying surface on the upper surface of the frame, a plurality of bolts extending downwardly from the frame in a series of rows, wheels mounted on the bolts, said wheels supporting the frame in an elevated position to provide access to the lower surface of the frame for lifting the pallet, and skids secured to the bottoms of the wheels, said skids comprising a plurality of parallel substantially flat members, each member bearing against the lower end of the wheels in a row to stabilize the lower surface of the wheels.

GILBERT W. WITHERS.

References Cited in the file of this patent

UNITED STATES PATENTS

| Number | Name | Date |
|---|---|---|
| 1,832,770 | Hallowell | Nov. 17, 1931 |
| 2,465,148 | Coonen | Jan. 22, 1949 |